United States Patent
Lejin P J et al.

(10) Patent No.: US 12,474,824 B2
(45) Date of Patent: Nov. 18, 2025

(54) HEADER FOR A USER INTERFACE TO TRACK DATA SUBMISSIONS

(71) Applicant: Salesforce, Inc., San Francisco, CA (US)

(72) Inventors: Jose Lejin P J, Bengaluru (IN); Ramanjaneyulu Y. Talla, Karnataka (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/969,066

(22) Filed: Oct. 19, 2022

(65) Prior Publication Data

US 2024/0134511 A1  Apr. 25, 2024
US 2024/0231589 A9  Jul. 11, 2024

(51) Int. Cl.
*G06F 3/0485* (2022.01)
*G06F 3/04847* (2022.01)

(52) U.S. Cl.
CPC ........ *G06F 3/04847* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 10,346,013 B2* | 7/2019 | Dilts | G06T 11/80 |
| 11,921,873 B1* | 3/2024 | McKervey | G06F 16/137 |
| 2007/0185826 A1* | 8/2007 | Brice | G06F 21/6227 |
| 2009/0144642 A1* | 6/2009 | Crystal | G06F 3/0482 715/764 |
| 2011/0289009 A1* | 11/2011 | Rankin, Jr. | G06Q 10/10 707/769 |
| 2013/0297468 A1* | 11/2013 | Hirsch | G06Q 10/109 705/32 |
| 2014/0143701 A1* | 5/2014 | Hoyer | G06Q 10/06 715/772 |
| 2015/0370440 A1* | 12/2015 | Joshi | H04L 12/1813 715/845 |
| 2016/0110046 A1* | 4/2016 | Yao | G06F 3/0485 715/784 |
| 2018/0253357 A1* | 9/2018 | Varley | G06F 11/1448 |
| 2022/0035865 A1* | 2/2022 | Lo | G06F 16/901 |
| 2022/0397985 A1* | 12/2022 | Singh | G06F 3/0481 |

* cited by examiner

*Primary Examiner* — Henry Orr
(74) *Attorney, Agent, or Firm* — Sterne, Kessler, Goldstein & Fox P.L.L.C.

(57) ABSTRACT

A header and a timestamp element for the header may be generated based on a request to process data for a page of a user interface. A tooltip with descriptive information for the timestamp element may be generated and displayed based on proximity of an interactive element to the timestamp element, and a page representation window may be displayed based on an interaction with the timestamp element. The page representation window includes a representation of the data field and its content that is indicative of how the data field and its content existed at a time of the request to process data. Moreover, an indicator of correspondence between the timestamp element and the page representation window may be displayed. Based on interaction with a settings indicator element, a header settings window for modifying settings for the header may be displayed with view options (e.g., all, custom, etc.) for data submissions.

20 Claims, 9 Drawing Sheets

Configuration Form
*Configure instance details based on your requirements*

208

Field Name 1  [ example 1 ]  ← 206a
Field Name 2  [ example 2 ]  ← 206b
Field Name 3  [         ]
Field Name 4  [         ]
Field Name 5  [         ]
Field Name 6  [         ]
Field Name 7  [         ]
Field Name 8  [         ]

Configuration Form
Configure instance details based on your requirements

Enter Data Identifiers Below:

Field Name 9

Field Name 10

Field Name 11

Configure Mappings 02-16-2022
10:05 AM

HEADER FOR A USER INTERFACE TO TRACK DATA SUBMISSIONS

BACKGROUND

Web applications, user interfaces (UI), and/or the like are used to configure, monitor and manage data for specific intents, for example, such as data used to configure network management devices, cloud-based systems (e.g., software as a service (SaaS) systems/components, etc.), private/public networks, and/or the like. Conventionally, web applications, UIs, and/or the like that enable users to configure multiple aspects of a target device and/or system utilize multiple rounds and/or instances of data (e.g., configuration information, etc.) submitted for processing at various stages. There are conventional tools for providing reference to the data submitted for processing via a web application and/or UI, for example, such as contextual configuration diff utility tools and/or the like. These tools only provide textual reference to data files that list differences between processed submissions. Conventional tools for providing reference to data submitted for processing via a web application and/or U) are unable to provide reference to all rounds and/or instances of data submission, regardless of whether the submissions are processed or fail to process. Further, conventional tools for providing reference to data submitted for processing via a web application and/or UI are unable to provide reference to how a view, screen, page, form, and/or the like of the web application and/or UI appeared at the time of each round and/or instance of data submission. When a user needs to refer to previous data submissions and/or views of a web application and/or UI that fail to process, they are unable to do so. Attempts to undo data submissions, restart data submission processes, and/or the like to record and/or view data submitted for processing via a web application and/or UI expends computing resources, are also time-consuming and error-prone, and very much affect the usability of the end-user.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 2A-2D shows an example of a user interface, according to some aspects.

DETAILED DESCRIPTION

Provided herein are system, apparatus, device, method, computer program product embodiments, and/or combinations and sub-combinations thereof, for providing a header (e.g., a timeline header, etc.) for a user interface to track data submissions. A user device (e.g., a computing device, a smart device, a mobile device, a laptop, a tablet, a set-top box, a display device, etc.) may generate and/or display a user interface (e.g., a configuration form/interface, a web form, a web page, an application page, a data form, etc.). The user interface may include a header for tracking data submissions. According to some aspects, the header may be generated based on a request to process data in a data field on a page of the user interface. According to some aspects, the header may include timestamped elements (e.g., interactive elements, etc.) that, when interacted with, cause display of a page representation window. According to some aspects, the page representation window includes a representation of the data field indicative of how the data field existed at a time when the request to process data is received and a representation of the data in the data field indicative of how the data in the data field existed at the time when the request to process data is received. For example, the page representation window may include a reference to how a page view, screen, form, and/or the like of the user interface appeared at the time when data was submitted for processing, irrespective of whether the submission was processed or failed to process.

A header, as described, is a tool that helps a user to reference, review, and/or understand various pages, views, screens, forms, and/or the like of a user interface the user may have accessed when (and/or before) submitting data to a backend and/or the like for processing. A header generated for a user interface to track data submissions alleviates the need for a user, device, and/or system to undo data submissions, restart data submission processes, and/or the like to record and/or view data submitted for processing via a user interface. Accordingly, a header generated for a user interface to track data submissions saves time and computing resources, prevents errors in referencing data submissions via textual reference to data files (e.g., contextual configuration diff utility tools, etc.), and also improves user interface usability and referencing for an end-user. These and other technological advantages are described herein.

Figure 1:
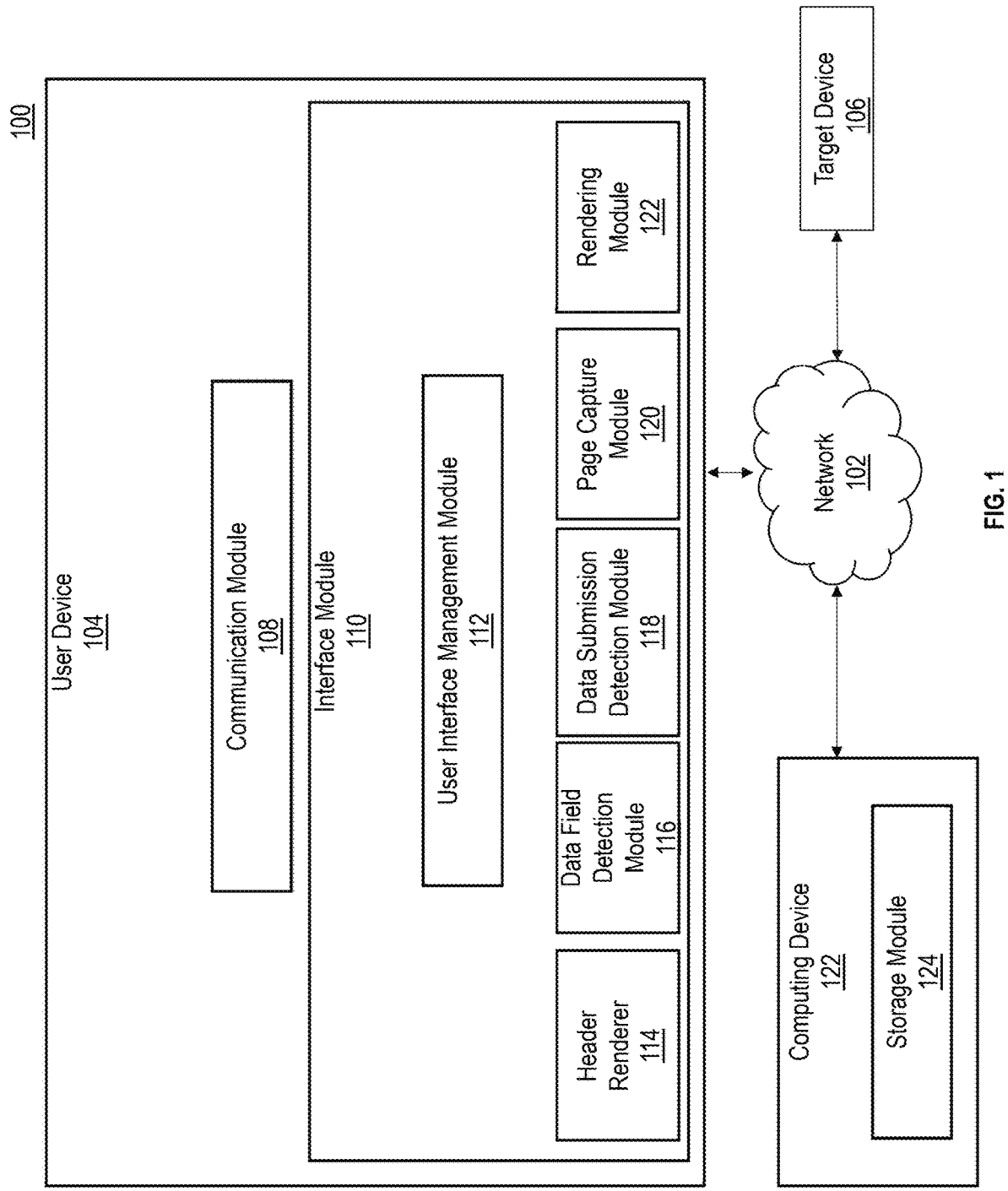
FIG. 1 shows an example system for providing a header for a user interface to track data submissions, according to some aspects.

FIG. 1 shows an example system 100 for providing a header (e.g., a timeline header, etc.) for a user interface to track data submissions. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include a network 102. The network 102 may include a packet-switched network (e.g., internet protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, content distribution network, and/or the like. The network 102 may provide and/or support communication from telephone, cellular, modem, and/or other electronic devices to and throughout the system 100. For example, the system 100 may include and support communications between a user device 104, a target device 106, and a computing device 124 via the network 102. Although shown as separate devices, according to some aspects, the user device 104, the target device 106, and/or the computing device 124 may be a single device and/or operate as a single device.

According to some aspects, the user device 104 may include, for example, a smart device, a mobile device, a laptop, a tablet, a display device, a computing device, or any other device capable of communicating with the target device 106 and/or the computing device 124. The user device 104 may include a communication module 108 that facilitates and/or enables communication with the network 102 (e.g., devices, components, and/or systems of the network 102, etc.), the target device 106, the computing device 124, and/or any other device/component of the system 100. For example, the communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects, the user device 104 may include an interface module 110. The interface module 110 enables a user to interact with the user device 104, the network 102, the target device 106, the computing device 124, and/or any other device/component of the system 100. The interface module 110 may include any interface for presenting and/or receiving information to/from a user.

The target device 106 may include a computing device, a network device, a cloud-device/component, an Internet-of-Things (IoT) device, a smart device, a system device, and/or any other type of device and/or system component. According to some aspects, the target device 106 may be any device, network, and/or system that may be configured by the user device 104, for example, via the user interface management module 112

According to some aspects, the interface module 110 may include the user interface management module 112. The user interface management module 112 enables a user to view web application documentation and/or content, application pages, webpages, and/or any other page of a user interface. The user interface management module 112 may be used to access and/or view pages, views, screens, forms, and/or the like of an application configured with, and/or accessible by the user device 104. The user interface management module 112 may be used to access various pages, views, screens, forms, and/or the like of a user interface (e.g., the interface module, a configuration form, etc.) generated by, configured with, and/or accessible by the user device 104.

According to some aspects, the user interface management module 112 may include a web browser (e.g., Internet Explorer®, Mozilla Firefox®, Google Chrome®, Safari®, or the like). The user interface management module 112 may request/query and/or send/provide various files from a local source and/or a remote source, such as the target device 106, and/or the like. The user interface management module 112 may access, process, and view information, web forms, web pages, and/or applications available to it from the system 100 via the network 102.

According to some aspects, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to browse? View? various pages, views, screens, forms, and/or the like of a user interface generated and/or displayed by the interface module 110 and/or accessible via the user interface management module 112. According to some aspects, interaction with the input devices and/or components may enable a user to manipulate and/or interact with components of a user interface, for example, a header, a page representation window, and/or the like.

According to some aspects, the interface module 110 may include a header renderer 114. The header renderer 114 may generate, render, and/or cause to be displayed a header, for example, overlaying a location/portion of a user interface including, but not limited to a web form, configuration form, and/or the like. According to some aspects, the header renderer 114 may communicate with the computing device 124 to receive data/information used to generate, render, and/or cause to be displayed a timeline.

According to some aspects, the computing device 124 may include, but is not limited to, web server, cloud-computing device, network device, and/or the like. The computing device 124 may include software and/or hardware that uses communication protocols including, but not limited to HTTP (Hypertext Transfer Protocol) and/or the like to respond to requests from the user device 104. The computing device 124 may respond to requests from the user device 104 (e.g., header renderer 114, etc.) with data/information needed to generate, render, and/or cause to be displayed a header, for example, overlaying a location/portion of a user interface. For example, the computing device 124 may include and/or be configured with a representational state transfer (REST) API that facilitates interactions with RESTful services, for example, such as timeline services and/or the like.

According to some aspects, the computing device 124 may include a storage module 126. The storage module 126 may include a document database and/or the like used to store timeline information and/or settings. Data/information used by the header renderer 114 to generate, render, and/or cause to be displayed a timeline, for example, overlaying a location/portion of a user interface, may be stored using an open standard file and data interchange format. An open standard file and data interchange format including, but not limited to JavaScript Object Notation (JSON) and/or the like, that uses human-readable text to store and transmit data objects consisting of key-value pairs and arrays.

According to some aspects, a header, for example, overlaying a location/portion of a user interface may be generated, rendered, and/or caused to be displayed by the header renderer 114 based on header configuration data/information received from the computing device 124 whenever the interface module 110 generates, launches, and/or causes to be displayed the user interface.

According to some aspects, the interface module 110 may include a data field detection module 116. The data field detection module 116 may detect and/or identify data fields (and/or any other type of field or component, etc.) of a user interface, such as a complex form used to configure the target device 106 and/or any other user interface. For example, the data field detection module 116 may perform code/script analysis (e.g., JavaScript analysis, etc.), form field recognition, and/or any other technique to detect and/or identify data fields (and/or data within the data fields) of a user interface.

FIG. 2A shows an example of a user interface 200 generated, accessed, and/or displayed by the interface module 110. The user interface 200 may present and/or display a view 204. According to some aspects, the view 204 may be a view, screen, page, form, and/or the like of the user interface 200. According to some aspects, the header renderer 114 may use data/information stored by the computing device 124 (e.g., storage module 126, etc.) to generate, render, and/or cause to be displayed a header 208. According to some aspects, the header 208 may be displayed overlaying the view 204. For example, the header 208 may be displayed overlaying a top portion and/or position of the view 204. According to some aspects, the header 208 may be displayed overlaying any portion and/or position of the view 204 that is selected, for example, by a user.

According to some aspects, the view 204 may include a plurality of data fields, for example, such as data fields 206*a* and 206*b*. According to some aspects, some data fields of the user interface 200 may include prefilled data, previously stored data, previously filled data, default data, and/or the like. For example, data field 206*a* may include "example 1" as prefilled data, previously stored data, previously filled data, default data, and/or the like. According to some aspects, some data fields of the user interface 200 may be filled with data/information and/or the like, for example, based on an interaction with an interactive element/component including, but not limited to a keyboard, a pointing device (e.g., a computer mouse, remote control, etc.), a microphone, a joystick, a tactile input device (e.g., touch screen, gloves, etc.), and/or the like. For example, data field 206*b* may be filled with data "example 2." According to some aspects, the data field detection module 116 may detect each of the plurality of data fields, for example, such as data fields 206*a* and 206*b*, and data in or input to the plurality of data fields (e.g., "example 1" in data field 206*a*, "example 2" in data field 206*b*, etc.).

Returning to FIG. 1, according to some aspects, as described, a user interface that is generated, accessed, and/or displayed by the interface module 110 enables a user to configure multiple aspects of a target device/system (e.g., the target device 106, etc.) via multiple rounds and/or instances of data (e.g., configuration information, etc.) submitted for processing at various stages. The user device 104 may detect and record each instance and/or occasion of data submission, for example, irrespective of whether the submission is processed or fails to process. According to some aspects, the interface module 110 may include a data submission detection module 118. The data submission detection module 118 may detect and record each instance and/or occasion of data submission irrespective of whether the submission is processed or fails to process.

According to some aspects, the data submission detection module 118 may communicate with and/or inform the header renderer 114 whenever data of a user interface is submitted for processing. In response, the header renderer 114 may generate, render, and/or cause to be displayed a timestamp element for a header displayed for a user interface. According to some aspects, a timestamp element may be an interactive element. According to some aspects, whenever an interactive component (e.g., a keyboard, a pointing device, a joystick, a tactile input device, etc.) of the user device 104 causes an indicator element (e.g., a curser, a pointer, a selector, etc.) to be in proximity to a timestamp element, a description of the timestamp element may be displayed. According to some aspects, a description of the timestamp element may include a date and time when the data of the user interface is submitted for processing.

FIG. 2B shows an example of the user interface 200 generated, accessed, and/or displayed by the interface module 110. The user interface 200 may present and/or display a view 210. According to some aspects, view 210 may be a view, screen, page, form, and/or the like of the user interface 200. For example, the user interface 200 may present and/or display the view 210 responsive to data in fields of view 204 being submitted for processing. According to some aspects, the header renderer 114 may generate, render, and/or cause to be displayed a timestamp element 212 for the header 208 displayed for the user interface 200. According to some aspects, the timestamp element 212 may be interactive. According to some aspects, whenever an interactive component (e.g., a keyboard, a pointing device, a joystick, a tactile input device, etc.) of the user device 104 causes an indicator element (e.g., a curser, a pointer, a selector, etc.) to be hovered over and/or be in proximity to a timestamp element, a description 214 of the timestamp element 212 may be displayed. According to some aspects, description 214 may include a date and time when data in fields of view 204 are submitted for processing. According to some aspects, header 208 may include multiple timestamp elements. According to some aspects, each timestamp element of the header 208 may correspond to a different occurrence of data in fields of different views, screens, pages, forms, and/or the like of the user interface 200 being submitted for processing irrespective of whether the submission was processed or failed to process. According to some aspects, a sequence indicated by the header for different timestamp elements may correspond to a sequence of corresponding requests to process the data in data fields on different views, screens, pages, forms, and/or the like of the user interface.

Returning to FIG. 1, according to some aspects, the data submission detection module 118 may inform a page capture module 120 whenever data of a user interface is submitted for processing. The page capture module 120 may capture and/or record a presentation and/or representation of any view, screen, page, form, and/or the like of the user interface associated with the data submission. According to some aspects, page capture module 120 may capture and/or record a presentation and/or representation of a data field of any view, screen, page, form, and/or the like of the user interface that is indicative of how the data field existed at a time when data in the data field is submitted for processing, and a representation of the data in the data field indicative of how the data in the data field existed at the time when the data in the data field is submitted for processing irrespective of whether the submission was processed or failed to process. According to some aspects, the page capture module 120 may capture and/or record a presentation and/or representation of any view, screen, page, form, and/or the like of the user interface associated with a data submission by storing data/information (e.g., text format data, etc.) indicative of the view, screen, page, form, and/or the like of the user interface. For example, the page capture module 120 may store a Document Object Model (DOM) and/or the like, that defines the logical structure of a view, screen, page, form, and/or the like of a user interface and the way the view, screen, page, form, and/or the like is accessed and manipulated.

According to some aspects, the page capture module 120 may capture and/or record a presentation and/or representation of any view, screen, page, form, and/or the like of the user interface associated with the data submission using a dynamic, lightweight, interpreted, and/or just-in-time compiled programming language with a first-class function that may be implemented via a pluggable application and/or the like. According to some aspects, the page capture module 120 may capture and/or record a presentation and/or representation of any view, screen, page, form, and/or the like of the user interface associated with the data submission, and data/information indicative of the capture and/or record of a presentation and/or representation of any view, screen, page, form, and/or the like may be stored by the storage module 126 of the computing device 124.

According to some aspects, the interface module 110 may include a rendering module 122. According to some aspects, the rendering module 122 may generate and/or cause to be displayed page representation windows. Each page representation window may be associated with a different timestamp element of a header of a user interface. According to some aspects, each timestamp element may be attached to, associated with, encoded with, and/or the like an event listener that monitors interactions with the timestamp element. According to some aspects, a page representation window may be generated and/or displayed based on an interaction with a timestamp element (e.g., a user uses an interactive component of the user device to click and/or select a timestamp element, etc.) detected and/or identified by a respective event listener.

According to some aspects, a page representation window may include a representation of each data field of a view, screen, page, form, and/or the like of the user interface indicative of how each data field existed at a time when data from the view, screen, page, form, and/or the like was submitted for processing. According to some aspects, the rendering module 122 may communicate with the page capture module 120 to receive data/information indicative of a presentation and/or representation of any view, screen, page, form, and/or the like of the user interface 104 associated with a data submission to generate, render, and/or present a page representation window.

According to some aspects, the rendering module 122 may generate, render, and/or present a page representation window by using a just-in-time compiled programming language such as JavaScript, Typescript, Dart, ClojureScript, Ruby, Python, and/or the like. For example, JavaScript with dynamic generation of a Document Object Model (DOM) and Cascading Style Sheets (CSS) may be used to generate, render, and/or cause the display of a page representation window. The user device 104 may use and/or implement any programming language to generate, render, and/or cause the display of a page representation window.

As previously described, according to some aspects, the header renderer 114 may generate, render, and/or present a header based on header configuration data/information stored by the computing device 124 (e.g., storage module 126, etc.). According to some aspects, EXAMPLE 1 below shows an example schema for storing header configuration data/information that may be used and/or implemented by the header renderer 114 to generate, render, and/or present a header.

EXAMPLE 1

```
[
  {
    userId: <User Id>,
    settings:
    {
      showMode: <ALL/CUSTOM>,
      customRange:
      {
        from: <DATE/TIME>,
        to: <DATE/TIME>
      }
    },
    timelines:
    [
```

EXAMPLE 1 -continued

```
      {
        dateTime: <DATE/TIME>,
        configurationFormDOM: <Captured configuration view
          including CSS in plain text format>
      },
      {
        dateTime: <DATE/TIME>,
        configurationFormDOM: <Captured configuration view
          including CSS in plain text format>
      },
      ...
    ]
  }
]
```

As used in EXAMPLE 1, 'userId' identifies a user account and/or profile used to generate, access, and/or display a view, screen, page, form, and/or the like of a user interface. As used in EXAMPLE 1, 'showMode' corresponds to the range of data submission events displayed as a timestamp element for a header. For example, if 'showMode' is set to 'ALL' then each data submission for a view, screen, page, form, and/or the like of a user interface will be represented on a header as a timestamp element. If 'showMode' is set to 'Custom' then a select and/or user-defined range of data submission for a view, screen, page, form, and/or the like of a user interface will be represented on a header as a timestamp element. As used in EXAMPLE 1, "configurationFormDOM" corresponds to a presentation and/or representation of any view, screen, page, form, and/or the like of a user interface captured by the page capture module 120, for example, including CSS in plain text format.

Figure 2C:
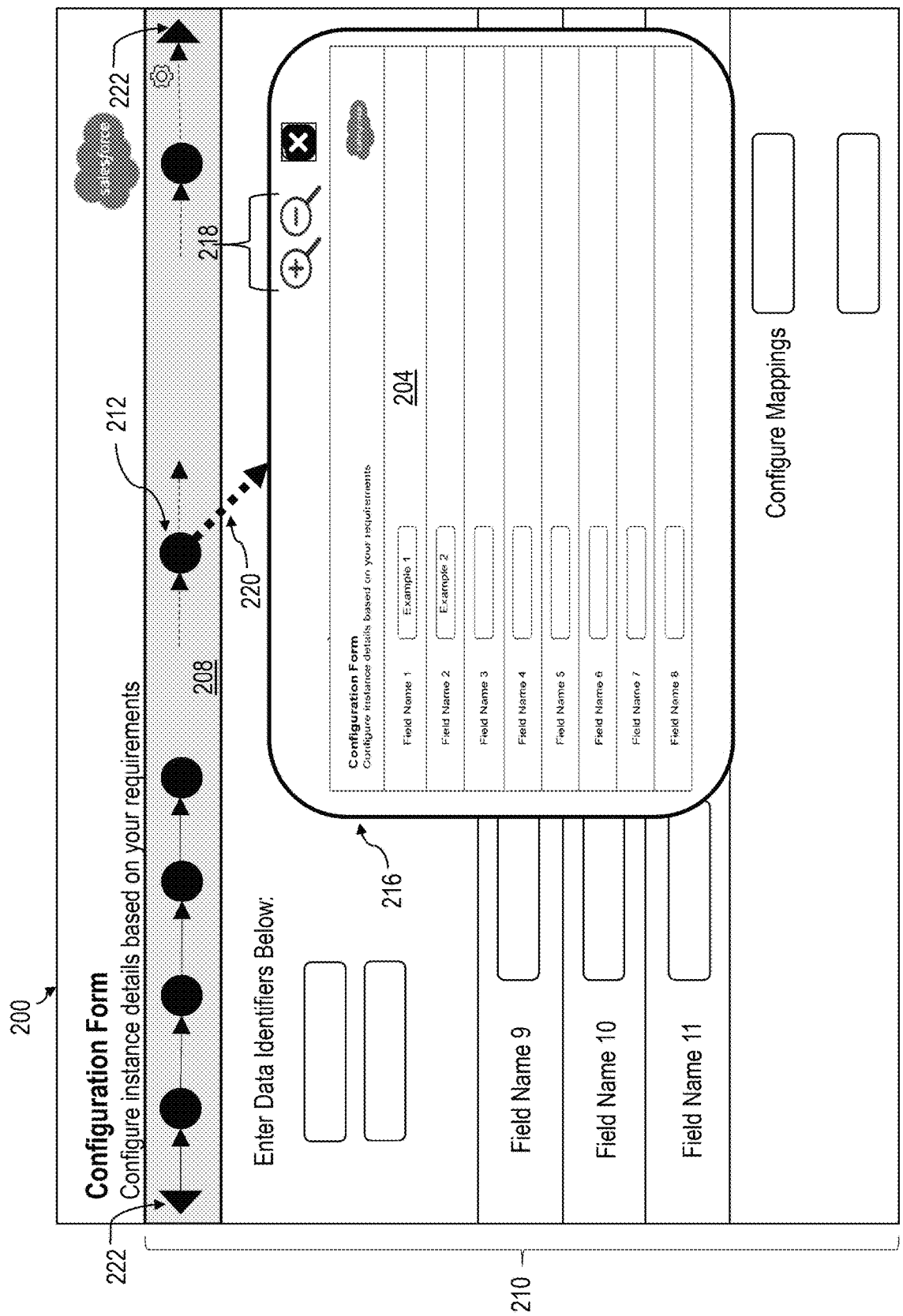

FIG. 2C shows an example of the user interface 200. The user interface 200 displays a page representation window 216. According to some aspects, the page representation window 216 may be generated and/or displayed based on an interaction with timestamp element 212 (e.g., a user uses an interactive component of the user device 104 to click and/or select the timestamp element 212, etc.) for the header 208. According to some aspects, the page representation window 216 may be generated and/or displayed by the rendering module 122 based on a DOM captured by the page capture module 120 and stored by the storage module 126. According to some aspects, the page representation window 216 includes a representation of view 204 of user interface 200 when data in the fields of view 204 of FIG. 2A are submitted for processing. According to some aspects, the representation of view 204 may be a read-only representation and/or the like.

According to some aspects, the representation of view 204 of user interface 200 is scaled to fit inside the page representation window 216. According to some aspects, page representation window 216 may include adjustment elements 218. The adjustment elements, when interacted with, enable the contents of the page representation window 216 (e.g., the representation of view 204, etc.) to be presented in a zoom-in/zoom-out view to display the contents of the page representation window 216 at varying sizes.

According to some aspects, the rendering module 122 may generate, render, and/or cause the display of an indicator element 220 (e.g., an arrow, a dotted line, etc.) that indicates correspondence between timestamp element 212 and the page representation window 216. According to some aspects, the rendering module 122 uses scalable vector graphics (SVG) and/or the like to generate, render, and/or cause the display of the indicator element 220. The indicator element 220 may overlay the view 210 and event listeners may be used to detect, determine, and/or identify whenever a location/position of the page representation window 216 changes so that the indicator element 220 may adjust to the changed location/position. For example, event listeners may be used to adjust and/or correct an angle of connection between the timestamp element 212 and the page representation window 216.

According to some aspects, the rendering module 122 may generate, render, and/or present a scrollable element 222 for the header 208. For example, the rendering module 122 may generate the scrollable element 222 for the header 208 based on the amount of timestamp elements (e.g., timestamp element 212, etc.) exceeding a timestamp element display threshold for the header 208. The scrollable element 222 may include, for example, a directional arrow(s), a scroll bar, a graphical indicator, and/or the like. The rendering module 122 causes timestamp elements and/or overflow timestamp elements (e.g., timestamp elements that do not fix within a viewable area, etc.) to be displayed within the header 208 based on an interaction with the scrollable element 222.

Returning to FIG. 1, according to some aspects, a header for a user interface may include a settings indicator element. According to some aspects, the header renderer 114 may generate, render, and/or cause the display of a settings indicator element for a header. According to some aspects, event listeners may be used to detect, determine, and/or identify whenever an interaction with a settings indicator element occurs. For example, a user may use an interactive component of the user device 104 to click and/or select the settings indicator element and event listeners may detect, determine, and/or identify whenever the interactive component of the user device 104 is used to click and/or select the settings indicator element. The event listeners may inform the rendering module 122 whenever the interactive component of the user device 104 is used to click and/or select the settings indicator element and the rendering module 122, in response, may generate, render, and/or cause the display a header settings window that that enables settings for the display of the header to be modified.

Figure 2D:
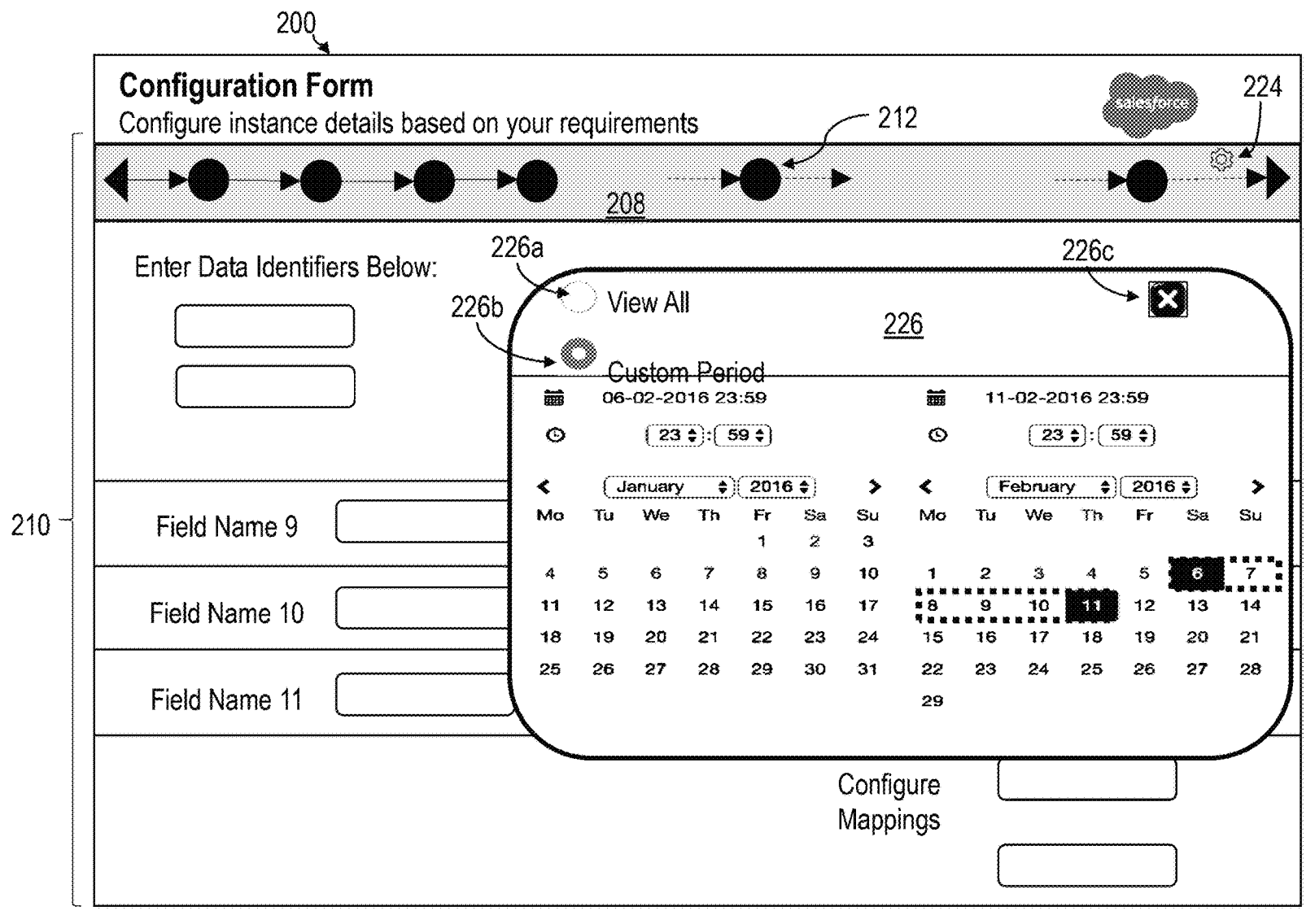

FIG. 2D shows an example of the user interface 200. The user interface 200 displays a header settings window 226. According to some aspects, user interface 200 displays the header settings window 226 whenever an interaction with a settings indicator element 224 occurs. For example, a user may use an interactive component of the user device 104 to click and/or select the settings indicator element 224 and, the header settings window 226 may be generated, rendered, and/or displayed. According to some aspects, interaction with interactive elements of the header settings window 226, for example, interactive elements 226a and 226b, enables settings for the display of the header 208 to be modified. Settings may include, but are not limited to, a time period and/or date/occurrence range of timestamp elements to be displayed by the header 208. For example, if interactive element 226a is selected, the header 208 will show a full range/timeline (e.g., every, etc.) of the respective timestamp element for each data submission associated with the user interface 200. According to some aspects, if interactive element 226b is selected, the header 208 will show a timeline of timestamp elements associated with data submissions occurring during specific dates and/or time periods. According to some aspects, the header settings window 226 may include interactive element 226c that, if interacted, may cause the header settings window 226 to close and/or no longer be displayed. According to some aspects, the header settings window 226 may close and/or no longer be displayed if a user uses an interactive component of the user device 104 to click and/or select an area of the user interface 200 outside of the header settings window 226.

Figure 3A:
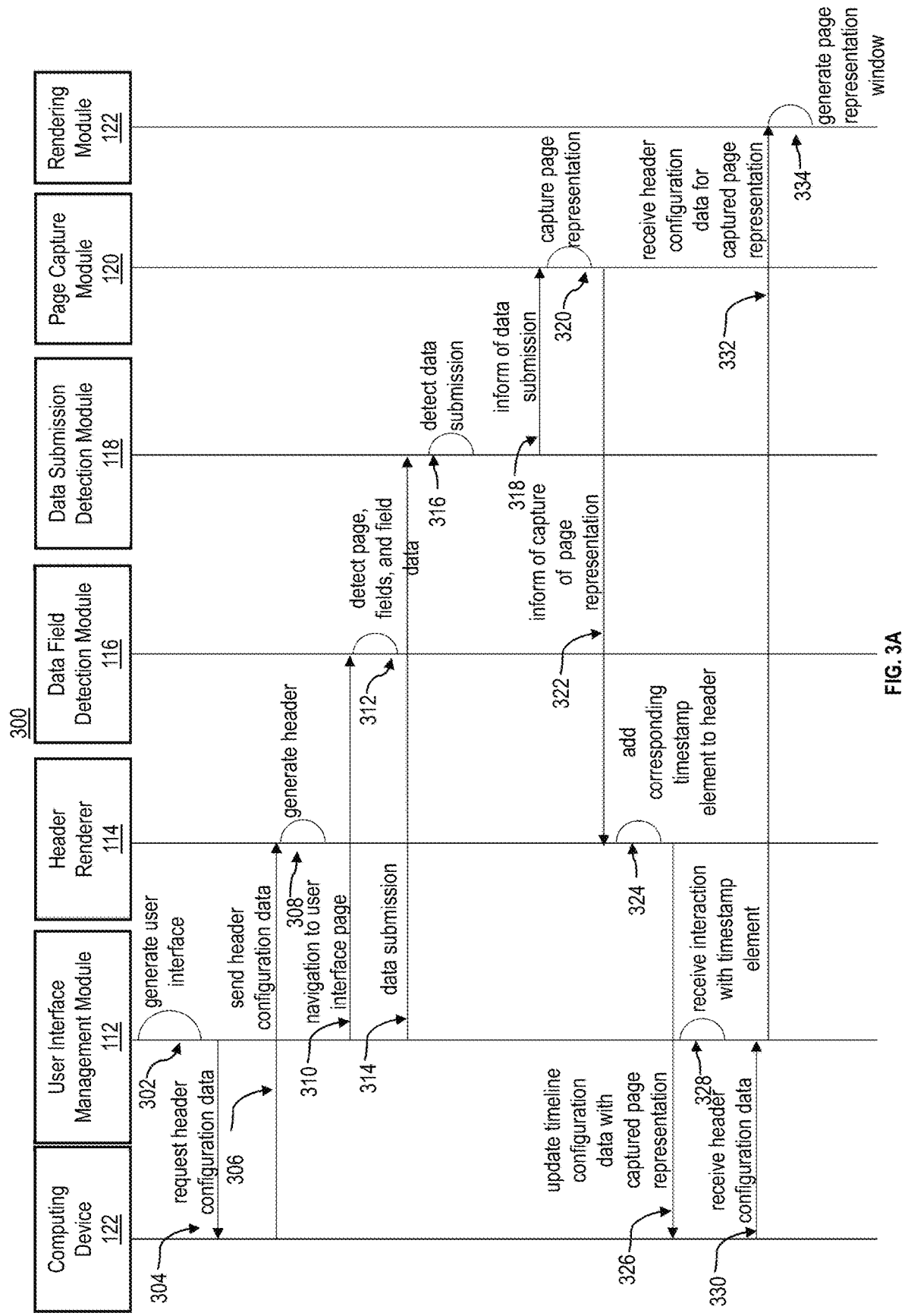
FIGS. 3A-3B shows an example communication diagram for providing a header for a user interface to track data submissions, according to some aspects.
Figure 3B:
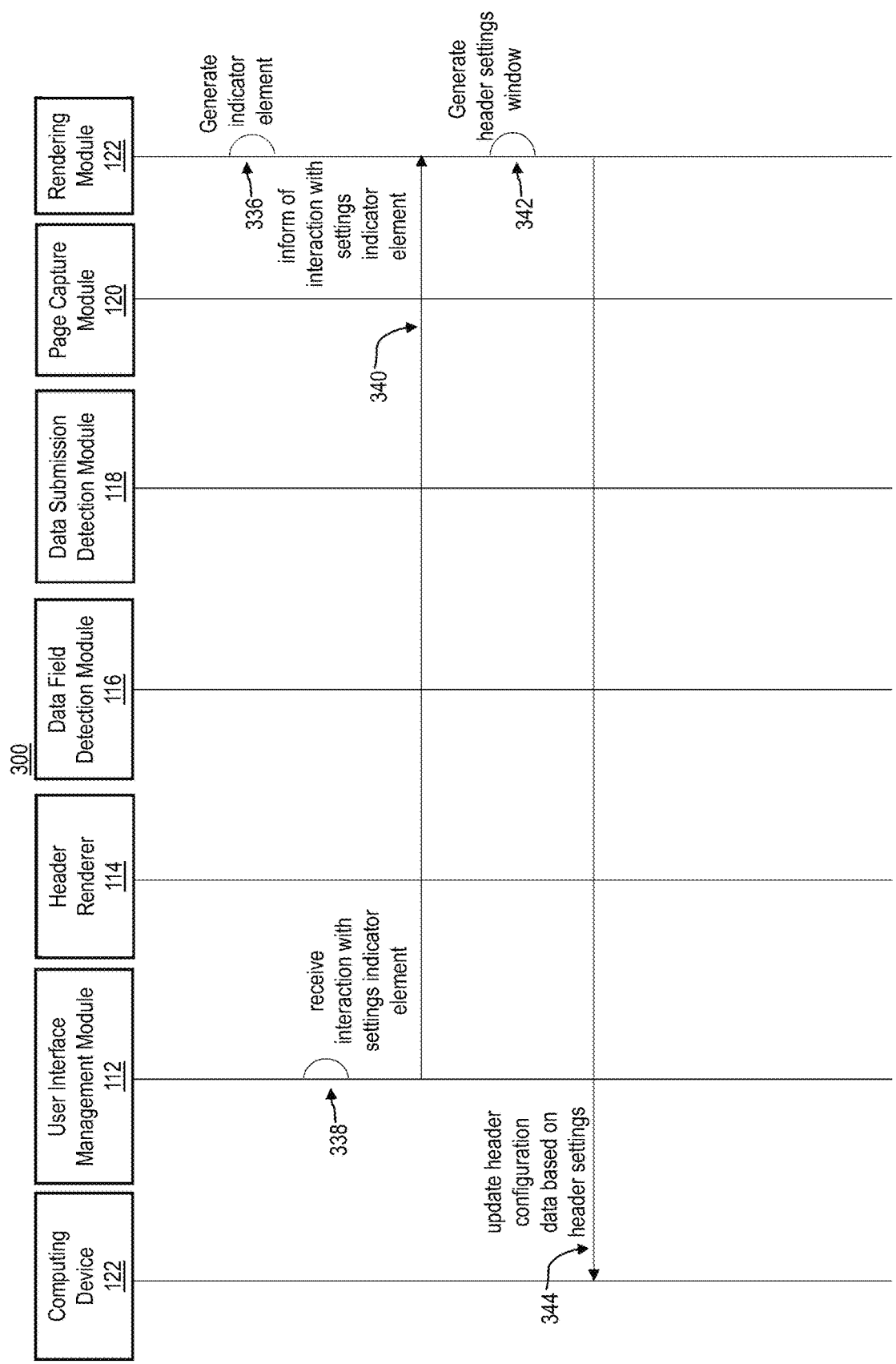

According to some aspects, FIGS. 3A-3B show an example communication diagram 300 for providing a header for a user interface to track data submissions. The communication diagram 300 depicts communications between and/or actions performed by components of the system 100 of FIG. 1, such as the computing device 124, the user interface management module 112, the header renderer 114, the data field detection module 116, the data submission detection module 118, the page capture module 120, the rendering module 122. The communications between and/or actions performed by components of system 100 facilitate and/or enable a header for a user interface to track data submissions.

Referring to FIG. 3A, in 302, the user interface management module 112 generates, launches, and/or causes to be displayed a user interface. The user interface may be, for example, a multipage, multi-view, multi-screen, multi-form, and/or the like used to configure a target device and/or the like. The user interface may include a plurality of data fields to which data and/or information may be input.

In 304, the user interface management module 112 may request header configuration information/data from the computing device 124. According to some aspects, the computing device 124 may store header configuration information in the form of JSON data and/or the like.

In 306, the computing device 124 sends the header configuration information to the header renderer 114.

In 308, the header renderer 114 generates a header for the user interface.

In 310, user interface management module 112 generates, launches, and/or causes to be displayed a page, view, screen, form, and/or the like of the user interface.

In 312, the data field detection module 116 detects and/or identifies each data field of the page, view, screen, form, and/or the like of the user interface as well as any data in the data fields.

In 314, data in at least one field of the page, view, screen, form, and/or the like of the user interface is submitted for processing via the user interface management module 112.

In 316, the data submission detection module 118 detects, determines, and/or identifies that the data in at least one field of the page, view, screen, form, and/or the like of the user interface is submitted for processing.

In 318, the data submission detection module 118 informs the page capture module 120 that the data in at least one field of the page, view, screen, form, and/or the like of the user interface is submitted for processing.

In 320, the page capture module 120 captures a representation of how the page, view, screen, form, and/or the like of the user interface exists at a time when the data in at least one field of the page, view, screen, form, and/or the like of the user interface is submitted for processing.

In 322, the page capture module 120 informs the header renderer 114 of the captured representation of how the page, view, screen, form, and/or the like of the user interface exists at the time when the data in at least one field of the page, view, screen, form, and/or the like of the user interface is submitted for processing.

In 324, the header renderer 114 adds a timestamp element to the header that corresponds to and/or indicates the occurrence of the time when the data in at least one field of the page, view, screen, form, and/or the like of the user interface is submitted for processing. According to some aspects, the header renderer 114 attaches (e.g., associates, encodes, etc.) event listeners that monitor all timestamp elements of the header and provide notification of any interaction with the timestamp elements.

In 326, the header configuration information/data stored by the computing device 124 is updated to include and/or indicate the captured representation of how the page, view, screen, form, and/or the like of the user interface exists at the time when the data in at least one field of the page, view, screen, form, and/or the like of the user interface is submitted for processing.

In 328, the user interface management module 112 receives an interaction with the timestamp element. For example, a user of the user device 104 may use a mouse and/or touchscreen to click, select, and/or the like the timestamp element.

In 330, the user interface management module 112 receives the header configuration information stored by the computing device 124 that includes and/or indicates the captured representation of how the page, view, screen, form, and/or the like of the user interface exists at the time when the data in at least one field of the page, view, screen, form, and/or the like of the user interface is submitted for processing.

In 332, the user interface management module 112 sends the header configuration information to the rendering module 122.

In 334, the rendering module 122 uses the header configuration information to generate, render, and/or cause to be displayed a page representation window. According to some aspects, the page representation window includes a representation of how the page, view, screen, form, and/or the like of the user interface exists at the time when the data in at least one field of the page, view, screen, form, and/or the like of the user interface is submitted for processing.

Referring to FIG. 3B, in 336, the rendering module 122 generates, renders, and/or causes the display of an indicator element (e.g., an arrow, a dotted line, etc.) that indicates correspondence between the timestamp element and the page representation window. According to some aspects, the rendering module 122 uses scalable vector graphics (SVG) and/or the like to generate, render, and/or cause the display of the indicator element.

In 338, the user interface management module 112 receives an interaction with a settings indicator element. For example, a user may use an interactive component of the user device 104 to click and/or select the settings indicator element and event listeners may detect, determine, and/or identify whenever the interactive component of the user device 104 is used to click and/or select the settings indicator element.

In 340 the user interface management module 112 informs the rendering module 122 of the interaction with a settings indicator element.

In 342, the rendering module 122 generates, renders, and/or causes the display of a header settings window that enables settings for the display of the header to be modified.

In 344, the header configuration information stored by the computing device 124 is updated to include any setting changes received via the header settings window.

According to some aspects, the rendering module 122 may adjust the indicator element to a changed location/position of the page representation window. For example, according to some aspects, the rendering module 122 may use indications from event listeners to adjust and/or correct an angle of connection between the timestamp element and the page representation window whenever a scroll (e.g., scroll up, scroll down, scroll left, scroll right, etc.), view/page adjustment, and/or the like of the user interface causes the location/position of the page representation window to change.

Figure 4:
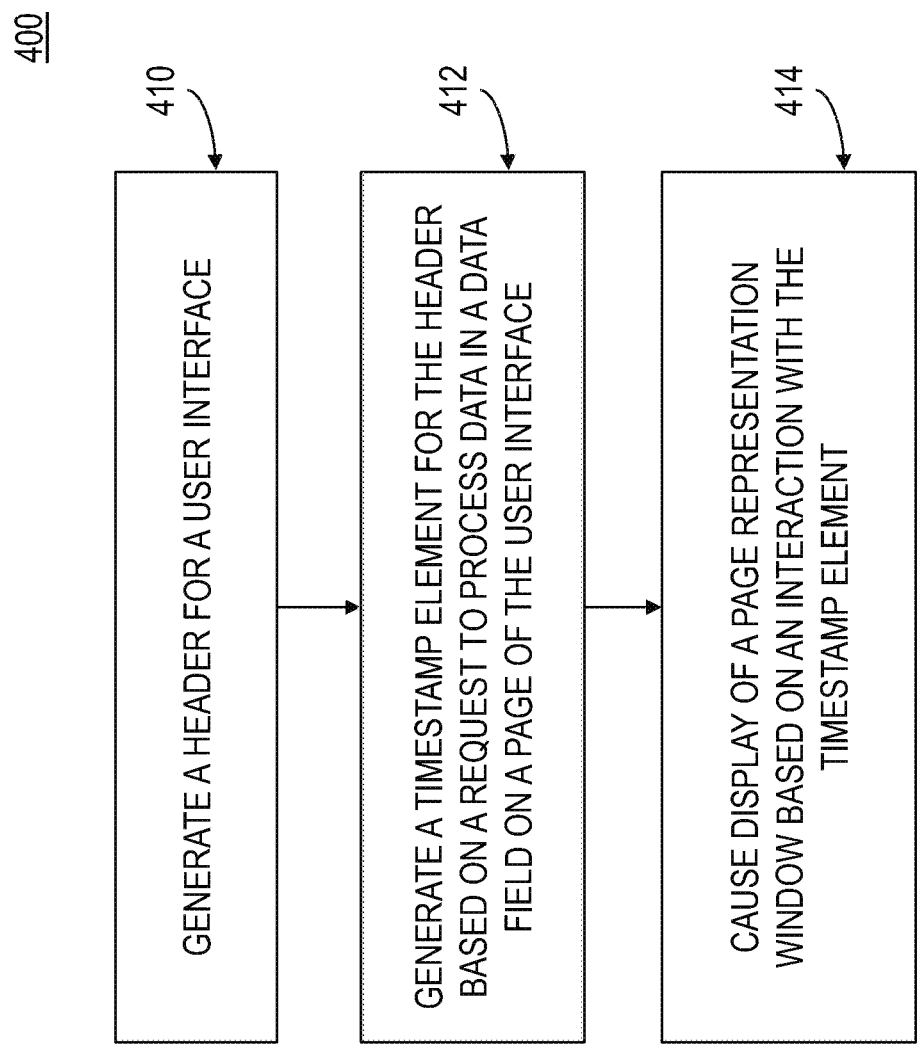
FIG. 4 shows a flowchart of an example method for providing a header for a user interface to track data submissions, according to some aspects.

FIG. 4 shows a flowchart of an example method 400 for providing a header for a user interface to track data submissions, according to some aspects. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. However, method 400 is not limited to the aspects of those figures.

In 410, user device 104 generates a header for a user interface. According to some aspects, user device 104 generates the header for the user interface based on loading, navigation to, and/or generation of the user interface. For example, the user interface may include, but is not limited to, a configuration form, a web form, and/or the like. According to some aspects, user device 104 generates the header for the user interface based on header configuration information received from a computing device (e.g., computing device 124, etc.).

In 412, user device 104 generates a timestamp element for the header. According to some aspects, user device 104 generates the timestamp element for the header based on a request to process data in a data field on a page of the user interface. For example, if the user device 104 is used to visit, display, navigate to, and/or the like a configuration view/form and submit data, then the user device 104 may generate the timestamp element for the header. According to some aspects, user device 104 generates the timestamp element for the header regardless of whether the data submission is successful or not.

According to some aspects, user device 104 generates a tooltip for the timestamp element that is displayed based on the proximity of an interactive element to the timestamp element (e.g., whenever a mouse is used to hover an indicator/arrow over the timestamp element, etc.). According to some aspects, the tooltip may include descriptive information (e.g., date/time of data submission, etc.) for the timestamp element.

According to some aspects, the header for the user interface comprises a settings indicator element. According to some aspects, user device 104 generates and/or causes the display of a header settings window that enables settings for the display of the header to be modified. According to some aspects, user device 104 may generate and/or cause the display of the header settings window based on an interaction with the settings indicator element.

According to some aspects, user device 104 sends to a computing device (e.g., computing device 124, etc.) page representation information that defines at least one of: a logical structure of the page or data representation rules for the page based on the request to process the data in the data field on the page of the user interface. According to some aspects, user device 104 may later request and use page representation information to generate page representation windows.

In 414, user device 104 causes display of a page representation window. According to some aspects, user device 104 causes display of the page representation window based on an interaction with the timestamp element. For example, a user of the user device 104 may use a mouse and/or touchscreen to click, select, etc. the timestamp element. According to some aspects, the page representation window may include a representation of the data field indicative of how the data field existed at a time when the request to process data is received and a representation of the data in the data field indicative of how the data in the data field existed at the time when the request to process data is received. That is, the page representation window may include the data/data field at the time the request to process data was received.

According to some aspects, user device 104 causes display of an indication element that indicates correspondence between the timestamp element and the page representation window. According to some aspects, user device 104 may adjust a position of at least a portion of the indication element to correspond to the position of the page representation window. The indication element may include, for example, a dotted line, an arrow, and/or the like.

According to some aspects, the method 400 may include the user device 104 generating another timestamp element for the header. According to some aspects, user device 104 generates another timestamp element for the header based on a request to process data in a data field on another page of the user interface. According to some aspects, user device 104 generates another timestamp element for the header regardless of whether the request to process data in the data field on another page of the user interface is successful or not. According to some aspects, a sequence indicated by the header for the timestamp element and the another timestamp element may correspond to a sequence of the request to process the data in the data field on the page and the request to process the data in the data field on the another page.

According to some aspects, the method 400 may further include the user device 104 generating a scrollable element for the header. According to some aspects, user device 104 generates a scrollable element for the header based on an amount of timestamp elements for the header exceeding a timestamp element display threshold for the header. The scrollable element may include, for example, a directional arrow(s), a scroll bar, a graphical indicator, and/or the like. The user device 104 may cause an additional timestamp element to be displayed within the header based on an interaction with the scrollable element.

Figure 5:
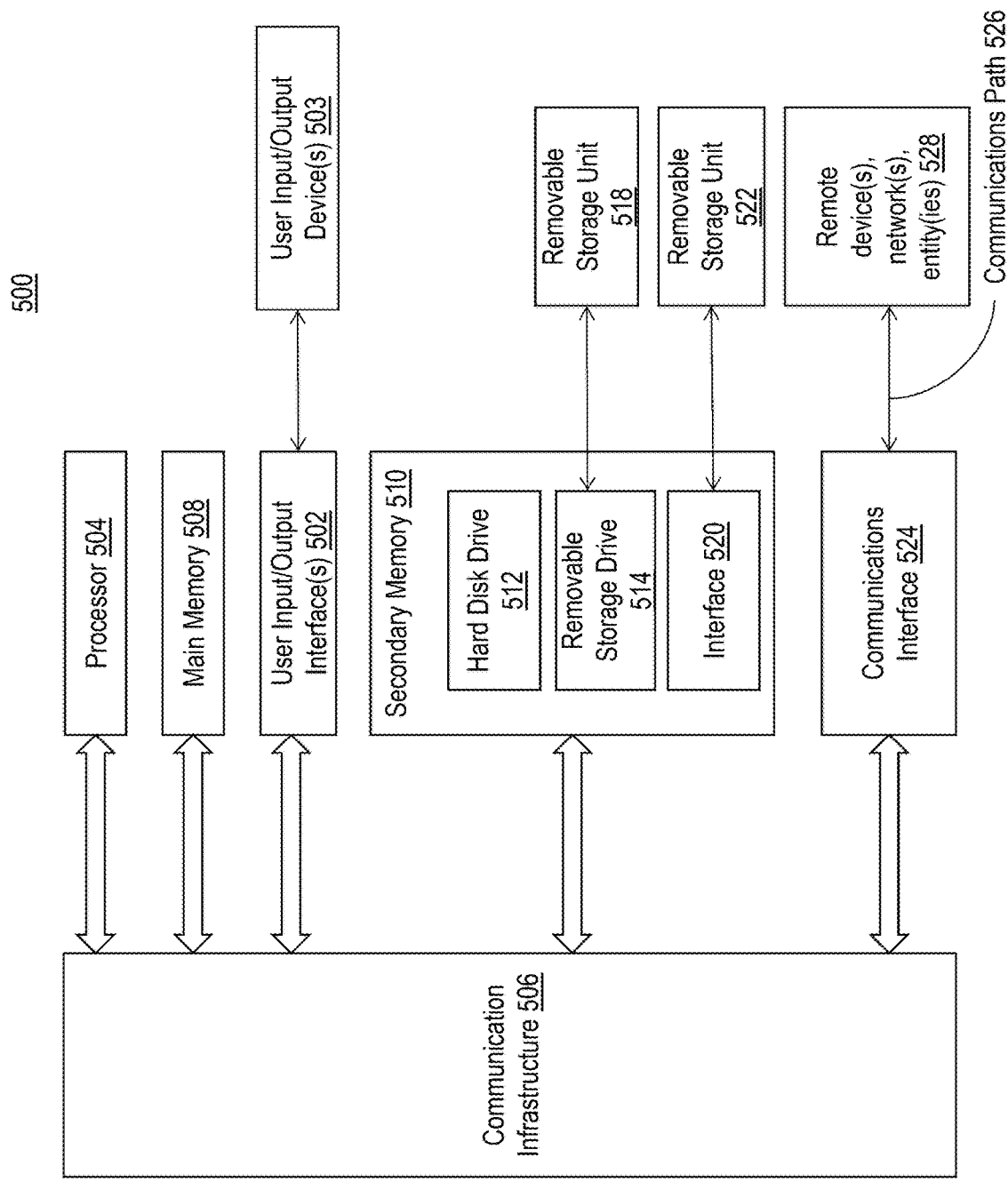
FIG. 5 shows a schematic block diagram of an example computer system in which aspects described may be implemented.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. According to some aspects, the user device 104 of FIG. 1 (and/or any other device/component described herein) may be implemented using the computer system 500. According to some aspects, the computer system 500 may be used to implement method 400 and/or any other methods and/or steps described herein.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure or bus 506 through user input/output interfaces(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. The removable storage unit 518 may include a computer-usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 may read from and/or write to the removable storage unit 518.

Secondary memory 510 may include other means, devices, components, instrumentalities, and/or other approaches for allowing computer programs and/or other instructions and/or data to be accessed by computer system 500. Such means, devices, components, instrumentalities, and/or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing a header for a user interface to track data submissions comprising:
   generating a header for a user interface that includes a timeline;
   generating, based on a request to process data in a data field on a page of the user interface, a timestamp element to be added to the timeline in the header;
   displaying, based on a first interaction with the timestamp element, a date and time associated with the timestamp element;
   displaying, based on a second interaction with the timestamp element, a page representation window overlaid onto the user interface such that the header remains visible and an indicator element that illustrates a connection between the timestamp element and the page representation window, the page representation window including a representation of the data field indicative of the data field at a time the request to process data is received, a representation of the data in the data field indicative of the data in the data field at the time the request to process data is received, and an adjustment element that adjusts a visual depiction of the representation of the data field and the representation of the data in the data field based on an interaction; and
   adjusting, based on a change in a location of the page representation window relative to a static location of the timestamp element, an angle of the indicated connection between the timestamp element and the page representation window, wherein the adjusting comprises at least one of decreasing the angle or increasing the angle between the timestamp element and the page representation window,
   wherein each timestamp element within the timeline corresponds to instances of submission of data in fields for processing.

2. The computer-implemented method of claim 1, further comprising generating, based on a request to process data in a data field on another page of the user interface, another timestamp element for the header, wherein a sequence indicated by the header for the timestamp element and the another timestamp element corresponds to a sequence of the request to process the data in the data field on the page and the request to process the data in the data field on the another page.

3. The computer-implemented method of claim 1, further comprising causing display of an indicator element that indicates correspondence between the timestamp element and the page representation window.

4. The computer-implemented method of claim 1, further comprising sending to a computing device, based on the request to process the data in the data field on the page of the user interface, page representation information that defines at least one of: a logical structure of the page or data representation rules for the page.

5. The computer-implemented method of claim 1, wherein the header for the user interface comprises a settings indicator element, the method further comprising causing, based on an interaction with the settings indicator element, display of a header settings window that enables settings for display of the header to be modified.

6. The method of claim 1, further comprising:
generating, based on an amount of timestamp elements for the header exceeding a timestamp element display threshold for the header, a scrollable element for the header; and
causing, based on an interaction with the scrollable element, an additional timestamp element to be displayed within the header.

7. The method of claim 1, further comprising generating a tooltip for the timestamp element that is displayed based on proximity of an interactive element to the timestamp element, wherein the tooltip comprises descriptive information for the timestamp element.

8. A non-transitory computer-readable medium having instructions stored thereon that, when executed by at least one computing device, cause the at least one computing device to perform operations comprising:
generating a header for a user interface that includes a timeline;
generating, based on a request to process data in a data field on a page of the user interface, a timestamp element to be added to the timeline in the header;
displaying, based on a first interaction with the timestamp element, a date and time associated with the timestamp element;
displaying, based on a second interaction with the timestamp element, a page representation window overlaid onto the user interface such that the header remains visible and an indicator element that illustrates a connection between the timestamp element and the page representation window, the page representation window including a representation of the data field indicative of the data field at a time the request to process data is received, a representation of the data in the data field indicative of the data in the data field at the time the request to process data is received, and an adjustment element that adjusts a visual depiction of the representation of the data field and the representation of the data in the data field based on an interaction; and
adjusting, based on a change in a location of the page representation window relative to a static location of the timestamp element, an angle of the indicated connection between the timestamp element and the page representation window,
wherein each timestamp element within the timeline corresponds to instances of submission of data in fields for processing.

9. The non-transitory computer-readable medium of claim 8, the operations further comprising generating, based on a request to process data in a data field on another page of the user interface, another timestamp element for the header, wherein a sequence indicated by the header for the timestamp element and the another timestamp element corresponds to a sequence of the request to process the data in the data field on the page and the request to process the data in the data field on the another page.

10. The non-transitory computer-readable medium of claim 8, the operations further comprising causing display of an indicator element that indicates correspondence between the timestamp element and the page representation window.

11. The non-transitory computer-readable medium of claim 8, the operations further comprising sending to a computing device, based on the request to process the data in the data field on the page of the user interface, page representation information that defines at least one of: a logical structure of the page or data representation rules for the page.

12. The non-transitory computer-readable medium of claim 8, wherein the header for the user interface comprises a settings indicator element, the operations further comprising causing, based on an interaction with the settings indicator element, display of a header settings window that enables settings for display of the header to be modified.

13. The non-transitory computer-readable medium of claim 8, the operations further comprising:
generating, based on an amount of timestamp elements for the header exceeding a timestamp element display threshold for the header, a scrollable element for the header; and
causing, based on an interaction with the scrollable element, an additional timestamp element to be displayed within the header.

14. The non-transitory computer-readable medium of claim 8, the operations further comprising generating a tooltip for the timestamp element that is displayed based on proximity of an interactive element to the timestamp element, wherein the tooltip comprises descriptive information for the timestamp element.

15. A system comprising:
a memory; and
at least one processor coupled to the memory and configured to perform operations comprising:
generating a header for a user interface that includes a timeline;
generating, based on a request to process data in a data field on a page of the user interface, a timestamp element to be added to the timeline in the header;
displaying, based on a first interaction with the timestamp element, a date and time associated with the timestamp element;
displaying, based on a second interaction with the timestamp element, a page representation window overlaid onto the user interface such that the header remains visible and an indicator element that illustrates a connection between the timestamp element and the page representation window, the page representation window including a representation of the data field indicative of the data field at a time the request to process data is received, a representation of the data in the data field indicative of the data in the data field at the time the request to process data is received, and an adjustment element that adjusts a visual depiction of the representation of the data field and the representation of the data in the data field based on an interaction; and adjusting, based on a change in a location of the page representation window relative to a static location of the timestamp element, an angle of the indicated connection between the timestamp element and the page representation window, wherein the adjusting comprises at least one of decreasing the angle or increasing the angle between the timestamp element and the page representation window, wherein each timestamp element within the timeline corresponds to instances of submission of data in fields for processing.

16. The system of claim 15, the operations further comprising generating, based on a request to process data in a data field on another page of the user interface, another timestamp element for the header, wherein a sequence indicated by the header for the timestamp element and the another timestamp element corresponds to a sequence of the request to process the data in the data field on the page and the request to process the data in the data field on the another page.

17. The system of claim 15, the operations further comprising causing display of an indicator element that indicates correspondence between the timestamp element and the page representation window.

18. The system of claim 15, the operations further comprising sending to a computing device, based on the request to process the data in the data field on the page of the user interface, page representation information that defines at least one of: a logical structure of the page or data representation rules for the page.

19. The system of claim 15, wherein the header for the user interface comprises a settings indicator element, the operations further comprising causing, based on an interaction with the settings indicator element, display of a header settings window that enables settings for display of the header to be modified.

20. The system of claim 15, the operations further comprising:
generating, based on an amount of timestamp elements for the header exceeding a timestamp element display threshold for the header, a scrollable element for the header; and
causing, based on an interaction with the scrollable element, an additional timestamp element to be displayed within the header.

* * * * *